(12) United States Patent
Noe

(10) Patent No.: US 9,214,842 B2
(45) Date of Patent: Dec. 15, 2015

(54) MOTOR

(75) Inventor: Gary D. Noe, Troy, OH (US)

(73) Assignee: Regal Beloit America, Inc., Beloit, WI (US)

( * ) Notice: Subject to any disclaimer, the term of this patent is extended or adjusted under 35 U.S.C. 154(b) by 1540 days.

(21) Appl. No.: 11/672,256

(22) Filed: Feb. 7, 2007

(65) Prior Publication Data

US 2008/0185923 A1 Aug. 7, 2008

(51) Int. Cl.
- H02K 5/08 (2006.01)
- H02K 9/197 (2006.01)
- H02K 1/27 (2006.01)
- H02K 5/173 (2006.01)

(52) U.S. Cl.
CPC .................. *H02K 9/197* (2013.01); *H02K 5/08* (2013.01); *H02K 1/2706* (2013.01); *H02K 5/1732* (2013.01)

(58) Field of Classification Search
CPC .................................. H02K 5/08; H02K 9/197
USPC ................. 310/43, 45, 156.23, 54, 74, 89, 90
See application file for complete search history.

(56) References Cited

U.S. PATENT DOCUMENTS

| | | | |
|---|---|---|---|
| 2,715,687 A * | 8/1955 | Makous | 310/87 |
| 2,871,791 A | 2/1959 | Litzenberg | |
| 2,967,960 A * | 1/1961 | Waldschmidt | 310/86 |
| 3,826,595 A | 7/1974 | Bottoms | |
| 3,853,429 A * | 12/1974 | Wiedenmann | 417/356 |
| 4,065,231 A | 12/1977 | Litzenberg | |
| 4,234,293 A | 11/1980 | Lightle | |
| 4,691,131 A | 9/1987 | Nakano | |
| 4,745,314 A | 5/1988 | Nakano | |
| 5,009,578 A | 4/1991 | Hyland | |
| 5,293,089 A | 3/1994 | Frister | |
| 5,397,220 A | 3/1995 | Akihisa et al. | |
| 5,490,319 A * | 2/1996 | Nakamura et al. | 29/596 |
| 5,779,453 A | 7/1998 | Nagayama et al. | |
| 6,313,556 B1 | 11/2001 | Dombrovski et al. | |
| 6,447,269 B1 | 9/2002 | Rexroth et al. | |
| 6,685,447 B2 | 2/2004 | Mabe et al. | |
| 2004/0018104 A1 * | 1/2004 | Watkins | 417/423.3 |

* cited by examiner

*Primary Examiner* — Thomas Truong
(74) *Attorney, Agent, or Firm* — Michael Best & Friedrich LLP

(57) ABSTRACT

A motor that is operable in response to an external power supply includes a stator core that is electrically connected to the external power supply and a rotor core positioned adjacent the stator core and rotatable about an axis in response to power being delivered to the stator core by the external power supply. A first encasement member is formed around the stator core to define a cavity and a second encasement member is formed around the rotor core and is sized such that at least a portion of the second encasement member and rotor core is disposed within the cavity. A quantity of coolant is disposed within the cavity.

7 Claims, 2 Drawing Sheets

MOTOR

BACKGROUND

The present invention relates to motors. More specifically, the invention relates to motors that are at least partially submersible.

Prior motors have been used in an aqueous environment, with the help of seals or other devices to prevent liquid from entering any portion of the motor that is electrified, such as the stator and/or the rotor. Some motors include channels around the motor housing that allow a liquid to flow around the housing and remove some of the heat produced by the motor. However, if any liquid were to leak into any portion of the stator or rotor, the motor could be damaged or could fail. As such, the life of the motor is dictated by the life of the seals that prevent the liquid from entering the stator and rotor.

SUMMARY

In one embodiment, the invention provides a motor that is operable in response to an external power supply. The motor includes a stator core that is electrically connected to the external power supply and a rotor core positioned adjacent the stator core and rotatable about an axis in response to power being delivered to the stator core by the external power supply. A first encasement member is formed around the stator core to define a cavity and a second encasement member is formed around the rotor core and is sized such that at least a portion of the second encasement member and rotor core is disposed within the cavity. A quantity of coolant is disposed within the cavity.

In another embodiment the invention provides a motor that includes a stator core that defines a cavity having a first open end and a second open end. A rotor core is positioned at least partially within the stator core. The motor also includes a quantity of coolant, at least a portion of which is positioned between the rotor core and the stator core. A first encasement member is coupled to the stator core to inhibit direct contact between the stator core and the coolant. The first encasement member covers the first open end. A second encasement member is coupled to the rotor core to inhibit direct contact between the rotor core and the coolant.

In another embodiment the invention provides a motor that is operable in response to a flow of external power from an external power supply. The motor includes a stator core including a winding that is electrically connected to the external power supply, and a rotor core positioned adjacent the stator core and operable in response to the flow of external power from the external power supply to rotate about an axis. A stator encasement member is formed around the stator core to completely encase the stator core. The stator encasement member defines a cavity. A bearing support is integrally-formed as a single part with the stator encasement member. A rotor encasement member is formed around the rotor core to completely encase the rotor core, at least a portion of the rotor encasement member and the rotor core are disposed within the cavity. A substantially non-metallic bearing is disposed in the bearing support and is adapted to at least partially support the rotor core for rotation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
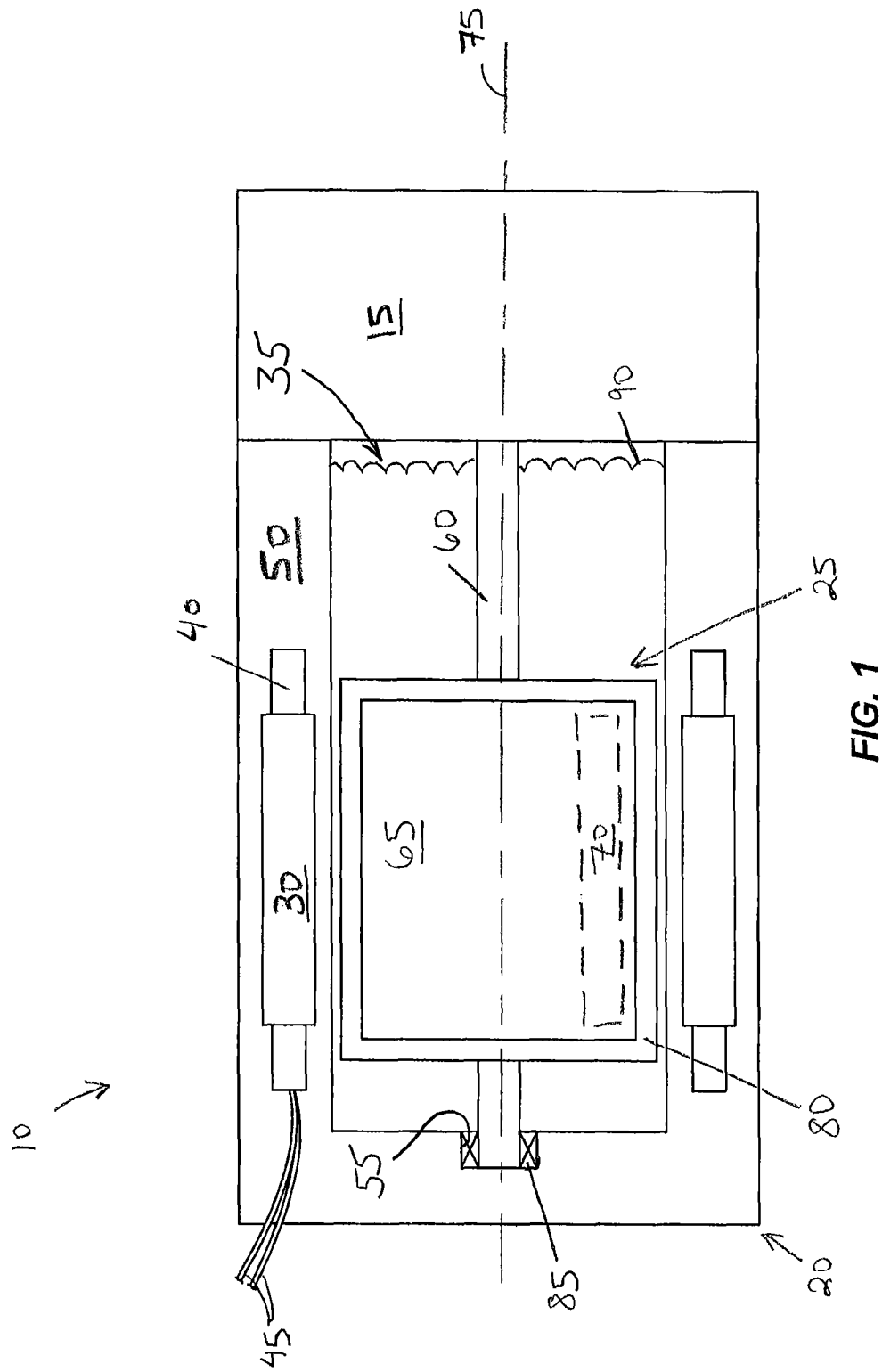
FIG. 1 is a schematic view of a motor, according to one embodiment of the invention.
Figure 2:
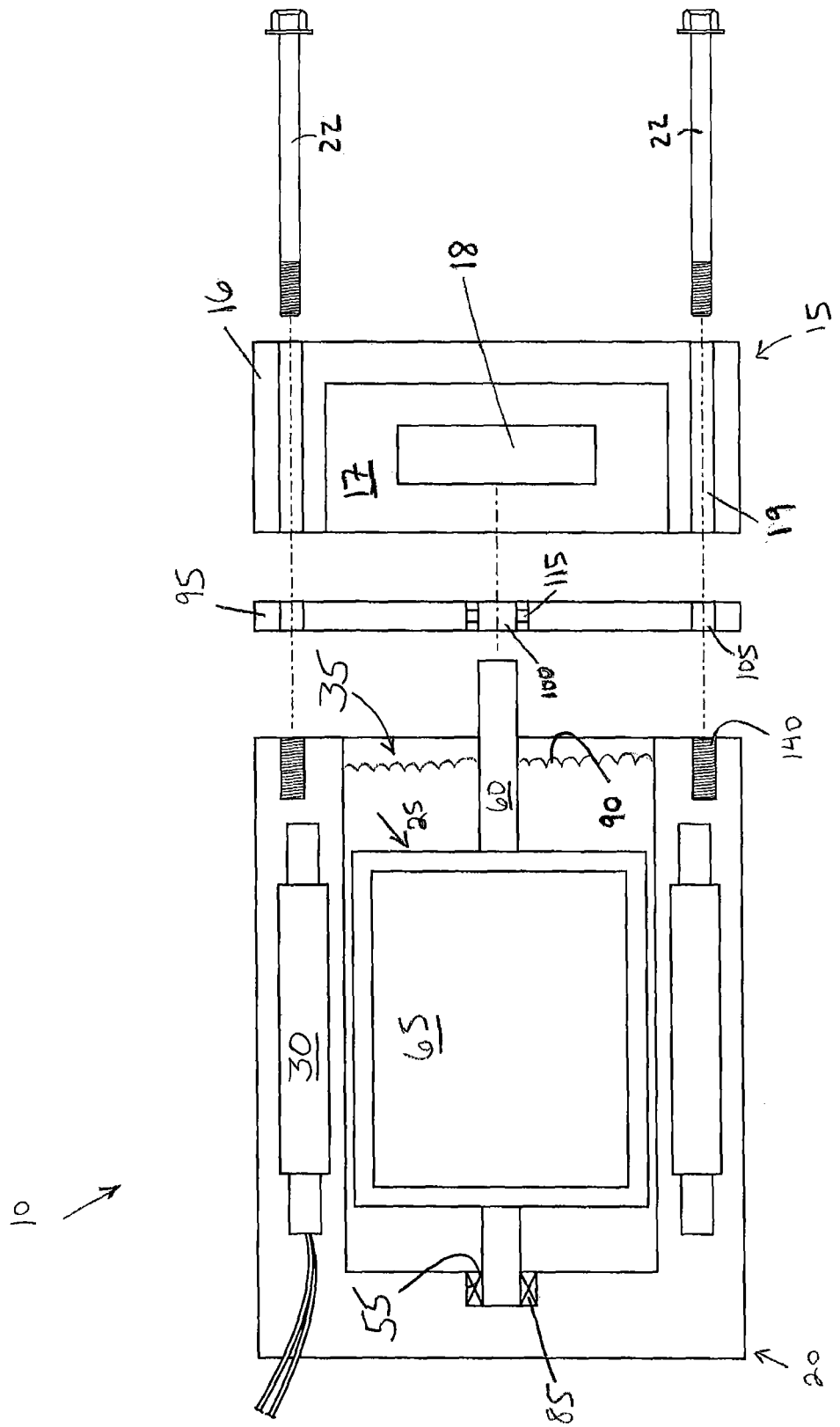
FIG. 2 is an exploded schematic view of the motor and driven device of FIG. 1, and including a cap.

FIG. 1 shows a motor 10 coupled to a driven device 15. The motor 10 includes a stator 20 and a rotor 25 positioned adjacent the stator 20. The driven device 15 is a device such as a pump, compressor, generator, alternator or the like that can be driven by the motor 10. As shown in FIG. 2, the driven device 15 includes a driven housing 16 that defines a cavity 17 and a driven element 18 which is driven by the rotor 25 and is positioned generally within the cavity 17. The driven housing 16 also includes apertures 19 for receiving fasteners 22 that aid in attaching the driven device 15 to the motor 10.

The stator 20 of FIG. 1 includes a stator core 30 that contains a plurality of windings 40. The windings 40 are electrically connected to a power source by motor leads 45. The power source may include a motor controller and a source of electricity as may be required by the particular motor design.

An encasement member or portion 50 is formed or otherwise positioned to substantially surround and enclose the stator core 30. The encasement portion 50 is shaped to define a space or cavity 35 that is sized to receive at least a portion of the rotor 25. The encasement portion 50 inhibits contact between substances disposed within the cavity 35 and the stator core 30. In addition, preferred constructions employ a corrosion-resistant material (e.g., plastic, composite, ceramics, etc.) to form the encasement portion 50.

In the illustrated construction, the stator core 30 and windings 40 are placed in a mold and the encasement portion 50 is injection molded around the stator core 30 and the windings 40. Thus, the encasement portion 50 completely encloses the stator core 30 and the windings 40 with an injection molded material, such as plastic. Of course, other methods of forming the encasement portion 50 are possible. Some other possibilities include brushing, dipping, spraying, chemically treating, etc. or any other similar ways that would cover the stator core 30 with a layer of material or an encasement portion 50 while also defining the stator cavity 35.

The encasement portion 50 preferably includes a polymer. However, other materials such as composites, ceramics, plastics, etc. or other corrosion-resistant material could be employed if desired. In a preferred construction, the encasement portion 50 is also an electrical insulator. Thus, the encasement portion 50 inhibits the flow of electricity across the encasement portion 50.

The encasement portion 50 includes a bearing support or pocket 55 that can be integrally-formed as part of the encasement portion 50. The bearing pocket 55 is essentially a recess that is sized to receive a bearing or other rotor support member. While preferred constructions form the bearing pocket 55 as part of the encasement portion 50, some machining or finishing operations may be required to assure the proper fit of a bearing 85.

The bearing 85 is positioned at least partially within the bearing support 55 to rotatably support the rotor shaft 60 adjacent the stator core 30. The bearing 85 includes a corrosion-resistant material that allows the bearing 85 to operate while submerged in a coolant 90. For example, the bearing 85 can include a non-metallic material, such as a polymer, composite, ceramic, or a corrosion resistant metal (e.g., nickel, stainless steel, bronze, etc.). In the illustrated construction, a sleeve or journal bearing 85 is employed. However, other constructions may employ a ball bearing, a thrust bearing, a needle bearing, a magnetic bearing, a roller bearing, etc. in place of, or in conjunction with the sleeve bearing.

The rotor 25 is positioned such that a portion of the rotor 25 is disposed within the cavity 35. The rotor 25 includes a rotor shaft 60 and a rotor core 65. The rotor core 65 is designed to operate with the stator 20, and as such, may include permanent magnets, windings, bars, etc. that interact with the stator 20 to produce rotation. In the illustrated construction, the rotor core 65 includes permanent magnets 70. The permanent magnets 70 interact with the windings 40 in the stator 20 to produce rotation of the rotor 25 about an axis 75. The rotor core 65 drives the rotor shaft 60, which in turn, drives the driven device 15.

It should be understood that while a permanent magnet rotor 25 is illustrated herein, other rotor and stator designs could be employed if desired. For example, die cast or squirrel cage rotors could be employed with a stator designed to operate as an induction motor. Similarly, an armature rotor could be employed for a DC motor. Thus, the invention should not be limited to the types of rotors or stators discussed herein.

The rotor core 65 is covered with a second encasement portion 80. Similar to the first encasement portion 50, the second encasement portion 80 inhibits contact between substances disposed within the cavity 35 and the rotor core 65. The second encasement portion 80 also inhibits corrosion of the rotor core 65 that might occur if the rotor core 65 was allowed to contact a potentially corrosive substance, such as coolant 90. In preferred constructions, a plastic material is used to form the second encasement portion 80 with other materials (e.g., polymers, ceramics, composites, etc.) also being suitable for use.

The second encasement portion 80 can be coupled to the rotor core 65 using a wide variety of methods. In the illustrated construction, the rotor core 65 is placed in a mold and the second encasement portion 80 is injection molded around the rotor core 65 to completely encase the rotor core 65. In other constructions, the second encasement portion 80 is coupled to the rotor core 65 using a suitable method, such as but not limited to brushing, dipping, spraying, chemically treating, or any other similar ways that would encase the rotor core 65.

When positioned for operation, the motor 10 is proximate or submerged in the coolant 90, such that the coolant 90 at least partially fills the cavity 35 defined by the encasement portion 50. Thus, the rotor core 65 may be partially or totally submerged in the coolant 90. In preferred constructions, water is employed as the coolant 90. However, other constructions may employ other liquids (e.g., glycol, water-ammonia solutions, etc.) or gasses (e.g., air, nitrogen, etc.) in place of or in conjunction with water. The encasement portion 50 lines the stator cavity 35 and the second encasement portion 80 covers the rotor core 65 such that substances that may cause corrosion, such as the coolant 90, are inhibited from touching the stator core 30, windings 40, or rotor core 65 directly. Even in constructions in which the stator cavity 35 is completely filled with coolant 90, corrosion of the stator core 30 and the rotor core 65 is inhibited by the corrosion-resistant encasement portions 50, 80.

In the construction of FIG. 1, the driven device 15 abuts the open end of the stator cavity 35 such that the driven device 15 and stator 20 completely enclose the cavity 35 and inhibit the entry of foreign particles into the stator cavity 35. In some embodiments, the driven device 15 can also inhibit the entry of coolant 90 into or out of the cavity 35.

FIG. 2 illustrates the motor 10 and driven device 15 of FIG. 1 and also includes a cap 95 positioned between the motor 10 and the driven device 15. The cap 95 includes an aperture 100 for receiving the rotor shaft 60. The cap 95 also includes a plurality of apertures 105 for receiving fasteners 22. In some constructions, there is clearance between the shaft 60 and the aperture 100 to allow for coolant flow. In other constructions, a bearing is positioned within the aperture 100 to at least partially support the rotor shaft 60 for rotation. In the illustrated construction, a seal 115 is positioned within the aperture 100 to improve the seal between the shaft 60 and the cap 95 and limit or inhibit the flow of coolant 90 into or out of the stator 20. The seal 115 in the aperture 100 controls the flow of coolant 90 that travels through the aperture 100. In some embodiments, the cap 95 has apertures (not shown) that regulate the amount of coolant 90 that is allowed to flow between the stator cavity 35 and the driven device 15. If it is desirable for coolant 90 to freely flow between the stator cavity 35 and the driven device 15, the cap 90 would have more apertures or larger apertures. If little or no flow was desired between the stator cavity 35 and the driven device 15, the cap 95 would have no apertures or a few small apertures that would allow only a small flow.

The encasement portion 50 of FIG. 2 is shown as including threaded apertures 140 for receiving fasteners 22. However, it is envisioned that other attachment means may be employed depending on the type of fasteners employed. For example, possible fasteners include, but are not limited to studs, screws, nails, rivets, welds and the like. In addition, other constructions may eliminate the fasteners and employ other systems to couple the motor 10 and the driven device 15.

In operation, the motor 10 draws a current through the motor leads 45 and into the windings 40 to generate a varying magnetic field. The rotor 25 interacts with the magnetic field of the stator 20 to produce rotation of the rotor 25. The rotating rotor 25 drives the driven device 15. The bearing 85 in the bearing support 55 of the encasement portion 50 at least partially supports the rotor shaft 60 for rotation. Coolant 90 can flow into and around the cavity 35 and the rotor 25 to cool the various components. The encasement portions 50, 80 inhibit contact between the stator core 30 and the coolant 90, and between the rotor core 65 and the coolant 90. Since the encasements portions 50, 80 and the bearing 85 are corrosion-resistant, limited corrosion will occur during operation of the motor 10, even though the stator 20, rotor shaft 60, and rotor core 65 are at least partially submerged in the coolant 90.

It should be noted that the illustrated encasement portions 50, 80 are illustrated as being relatively thick structural members. However, other constructions may employ thinner or thicker encasement portions 50, 80. In some constructions, thin protective layers may be employed as encasement portions.

Various features and advantages of the invention are set forth in the following claims.

What is claimed is:

1. A motor comprising:
    a stator core having an exposed outer surface and defining a cavity having a first open end and a second open end;
    a rotor core positioned at least partially within the stator core;
    a quantity of coolant, at least a portion of which is positioned between the rotor core and the stator core;
    a first encasement member completely enveloping the entire stator core to inhibit direct contact between the stator core and the coolant, the first encasement member covering the first open end and being in direct contact with substantially the entire exposed outer surface of the stator core;
    a second encasement member coupled to the rotor core to inhibit direct contact between the rotor core and the coolant; and
    a cap coupled to the first encasement such that the cap substantially covers the second open end to substantially seal the quantity of coolant within the first encasement member.

2. The motor of claim 1, further comprising a bearing support portion integrally-formed as part of the first encasement member.

3. The motor of claim 2, further comprising a bearing at least partially supported by the bearing support, the bearing positioned to at least partially support the rotor core for rotation.

4. The motor of claim 3, wherein the bearing is substantially non-metallic.

5. The motor of claim 1, wherein the coolant is water.

6. The motor of claim 1, wherein at least one of the first encasement member and the second encasement member is a polymer.

7. The motor of claim 1, wherein the stator core is completely encased within the first encasement member and the rotor core is completely encased within the second encasement member.

* * * * *